Nov. 3, 1964 R. F. BEEREND 3,155,304
BAKING PAN WITH REPLACEABLE LINER
Filed Feb. 19, 1962
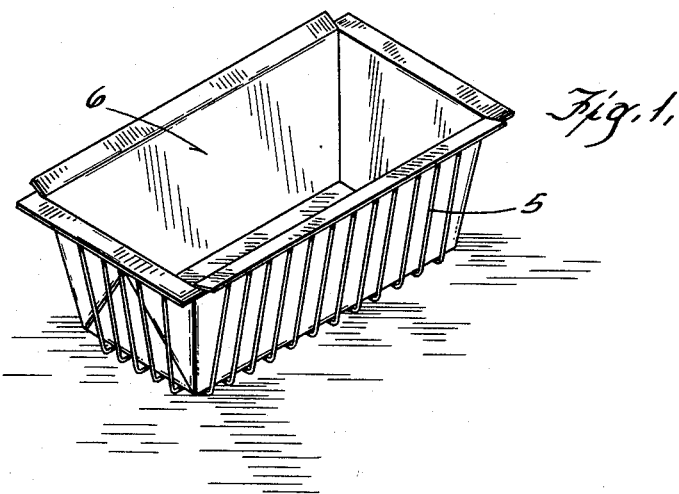
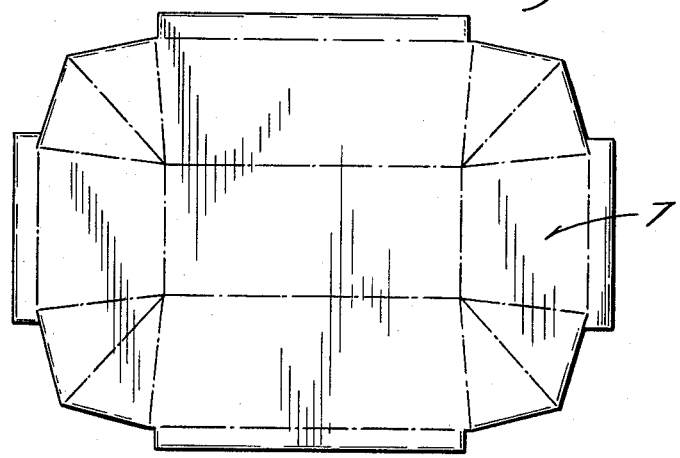
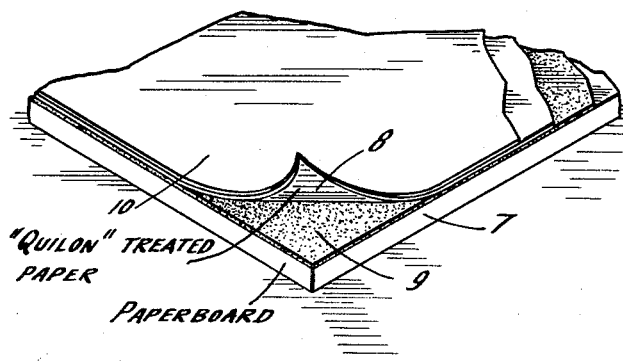
INVENTOR.
RAY F. BEEREND
BY
Wheeler, Wheeler, Wheeler
ATTORNEYS.

3,155,304
BAKING PAN WITH REPLACEABLE LINER
Ray F. Beerend, Vermilion, Ohio, assignor, by mesne assignments, to Basic Food Materials, Inc., a corporation of Delaware
Filed Feb. 19, 1962, Ser. No. 174,164
3 Claims. (Cl. 229—3.1)

This invention relates to a baking pan with replaceable liner.

Baking pans, usually made of wire mesh material and lined with replaceable cardboard trays, have long been known and have been used for cooking such products as meat loaf and bread. Economies in the use of such pans have been reduced somewhat by the necessity of greasing the surface of the liner before the food product is placed therein to be cooked.

Both for reasons of economy and to facilitate disposal, it is desirable that any improved surface provided for the blank from which the pan is made should desirably be non-metallic and readily combustible.

After trying a variety of laminates over a period of years, it was found that the problems could be solved by making up the renewable pans from shell stock laminated with "Quilon" treated paper. "Quilon" is a material well known as a material for imparting grease and water resistance but, as applied to this particular product, it has very desirable "release" characteristics which make it unnecessary to grease the pan preliminary to use.

In the drawings:

FIG. 1 is a view in perspective showing an assembled tray and liner.

FIG. 2 is a plan view of the liner blank.

FIG. 3 is a fragmentary detail view in perspective on a greatly enlarged scale showing a portion of the laminate turned back.

Mechanical support is provided by the metal tray 5 which is conveniently made of wire as shown. The liner 6 is folded from a blank 7 and inserted in the tray. The food is cooked in the liner and may be removed in the liner from tray 5 and remain in the liner until consumed. In case the cooking is done commercially, the liner constitutes a container which facilitates packaging and displaying for sale.

No claim is made herein to the form or outline of the liner blank except that it preferably is seamless, with side walls integrally joined by folded corners. The invention contemplates that all surfaces of the blank which are to be exposed to the food to be coated with a material which is not only grease and water resistant but has release characteristics such as to make it unnecessary to grease the liner before the food is inserted. An ideal material for this purposes is a product of Du Pont well-known as a sizing compound and dye fixant and called "Quilon." "Quilon" is stearato-chromic-chloride. "Quilon" coated paper is also known, having heretofore been used, because of its grease resistance, as a wrapping paper.

It is impractical to apply "Quilon" directly to paperboard of a grade suitable for the one-use liner 6. Instead of applying "Quilon" directly to the paperboard which gives the liner its strength, it is preferred to supply the release coating by laminating "Quilon"-treated paper adhesively to the board. By way of example, and not by way of limitation, the board 7 used in preferred practice is a double lined shell stock having the following specification:

Basic weight _____ 65#/M.
Caliper _____ .016".
Moisture _____ 6%.
BRDA bend _____ 2–2.

The "Quilon"-treated paper 8 laminated to the board by adhesive 9 is a 25 pound paper having a caliper of about .002. While the "Quilon" material is not visibly apparent as a separate coating, it has been so represented at 10 for the purposes hereof.

The product so made retains all components of the food placed in the liner and still the cooked food is readily released from the liner or container and the container is combustible and hence readily disposable.

I claim:

1. A seamless, disposable paper container for cooking and merchandising food, said container being adapted to be mounted in and freely removable from a supporting tray, said container being adapted for handling independently of said tray and comprising a paperboard base having integral bottom and side wall portions and means for providing seamless continuity of surface between the side wall portions and including folded corner portions between and having folded integral connection with adjacent side wall portions, each of said corner portions being folded against one of said side wall portions, the inner surface of the container having a seamless coat of stearato-chromic-chloride sizing extending continuously over all of said portions and having release characteristics and resistance to water and grease penetration into the paperboard base.

2. A container according to claim 1 in which the paperboard base has laminated to it a co-extensive sheet of paper having one face adherent to all of said portions and another face bearing the said coat of stearato-chromic-chloride sizing.

3. A seamless, disposable paper container for cooking and merchandising food, said container being adapted to be mounted in and freely removable from a supporting tray, said container being adapted for handling independently of said tray and comprising a paperboard base having integral bottom and side wall portions and means for providing seamless continuity of surface between the side wall portions and including folded corner portions between and having folded integral connection with adjacent side wall portions, the inner surface of said paperboard base having laminated to it a co-extensive sheet of paper of approximately 25 lb. weight with a caliper of about .002, said paper being continuous over all of the inner surfaces of the bottom and side wall portions and corner portions of said base, and having one face in adhesive connection to all of said portions and an inner face bearing an exposed coat of stearato-chromic-chloride sizing which is continuous across all of said portions and has release characteristics and is resistant to water and grease penetration into the paperboard base.

References Cited in the file of this patent
UNITED STATES PATENTS

| | | |
|---|---|---|
| 2,150,910 | Chaplin | Mar. 21, 1939 |
| 2,407,118 | Waters | Sept. 3, 1946 |
| 2,723,212 | Aarons | Nov. 8, 1955 |
| 2,726,164 | Eichmeier | Dec. 6, 1955 |
| 2,782,976 | Rinaldi et al. | Feb. 26, 1957 |